No. 682,619. Patented Sept. 17, 1901.
A. O. HUBBARD.
PROCESS OF PRODUCING WOOD AND WIRE FABRICS.
(Application filed Nov. 5, 1900.)

(No Model.) 4 Sheets—Sheet 1.

No. 682,619. Patented Sept. 17, 1901.
A. O. HUBBARD.
PROCESS OF PRODUCING WOOD AND WIRE FABRICS.
(Application filed Nov. 5, 1900.)
(No Model.) 4 Sheets—Sheet 2.
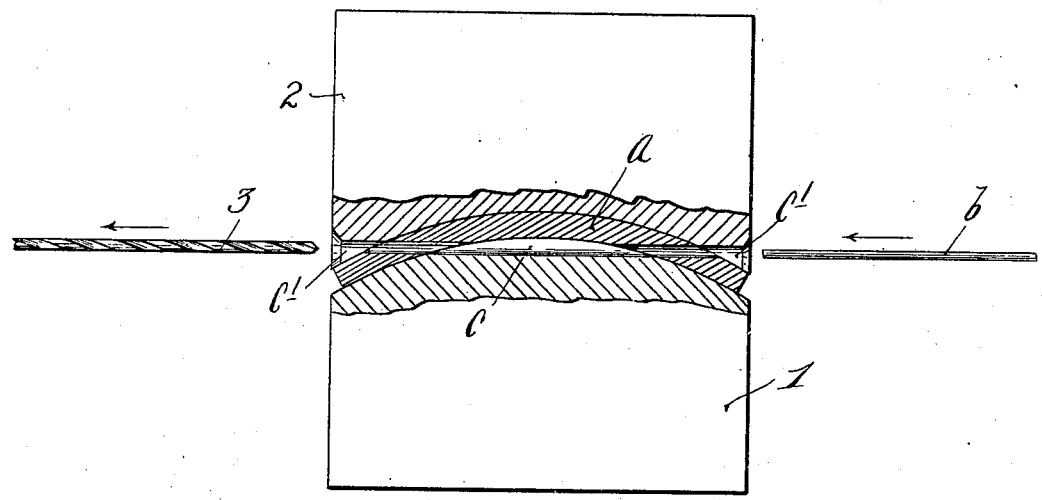
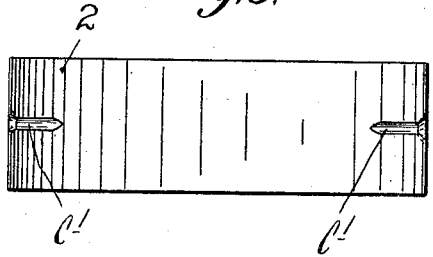
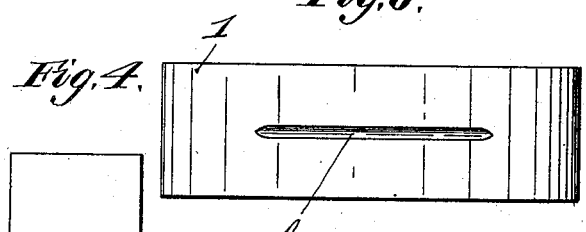
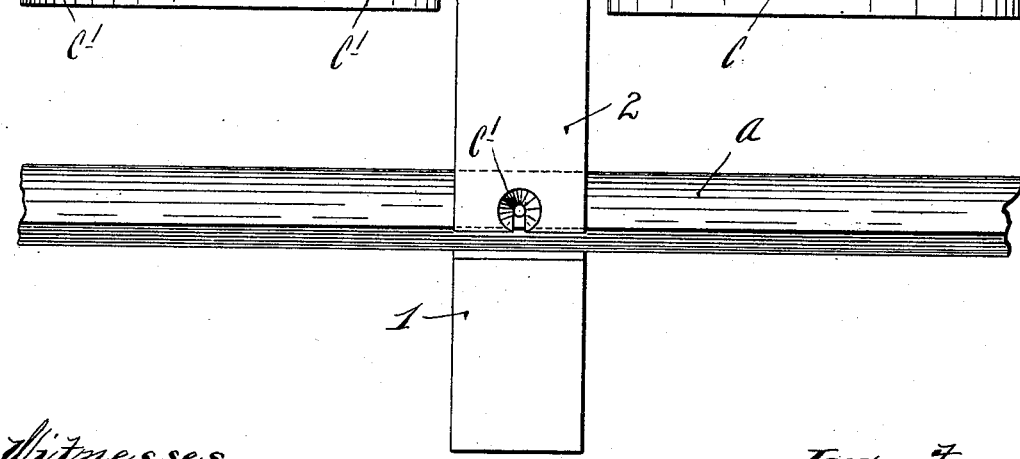
Witnesses,
Harry Kilgore
Mabel M. McGiroy
Inventor,
Arthur O. Hubbard
By his Attorneys,
Williamson & Merchant
THE NORRIS PETERS CO., PHOTO-LITHO., WASHINGTON, D. C.

No. 682,619. Patented Sept. 17, 1901.
A. O. HUBBARD.
PROCESS OF PRODUCING WOOD AND WIRE FABRICS.
(Application filed Nov. 5, 1900.)

(No Model.) 4 Sheets—Sheet 3.

Witnesses,
Harry Kilgore
Mabel M. McCrory

Inventor,
Arthur O. Hubbard,
By his Attorneys,
Williamson & Merchant

THE NORRIS PETERS CO., PHOTO-LITHO., WASHINGTON, D. C.

No. 682,619. Patented Sept. 17, 1901.
A. O. HUBBARD.
PROCESS OF PRODUCING WOOD AND WIRE FABRICS.
(Application filed Nov. 5, 1900.)
(No Model.) 4 Sheets—Sheet 4.

Witnesses:
Harry Kilgore
Mahl M. McGray

Inventor.
Arthur O. Hubbard,
By his Attorneys.
Williamson & Merchant

UNITED STATES PATENT OFFICE.

ARTHUR O. HUBBARD, OF MINNEAPOLIS, MINNESOTA.

PROCESS OF PRODUCING WOOD-AND-WIRE FABRICS.

SPECIFICATION forming part of Letters Patent No. 682,619, dated September 17, 1901.

Application filed November 5, 1900. Serial No. 35,441. (No specimens.)

*To all whom it may concern:*

Be it known that I, ARTHUR O. HUBBARD, a citizen of the United States, residing at Minneapolis, in the county of Hennepin and State of Minnesota, have invented certain new and useful Improvements in Processes of Producing Wood-and-Wire Fabrics; and I do hereby declare the following to be a full, clear, and exact description of the invention, such as will enable others skilled in the art to which it appertains to make and use the same.

My present invention has for its object to provide an improved process or method of producing wood-and-wire fabrics suitable for use in manufacturing crates, boxes, baskets, and many other articles.

To this end the invention consists of the novel steps of manipulation hereinafter described and defined in the claims.

In the accompanying drawings both apparatus and product are illustrated for the purpose of more clearly disclosing the practical manner in which the method may be carried out, as well as the results of the said method.

Figure 1:
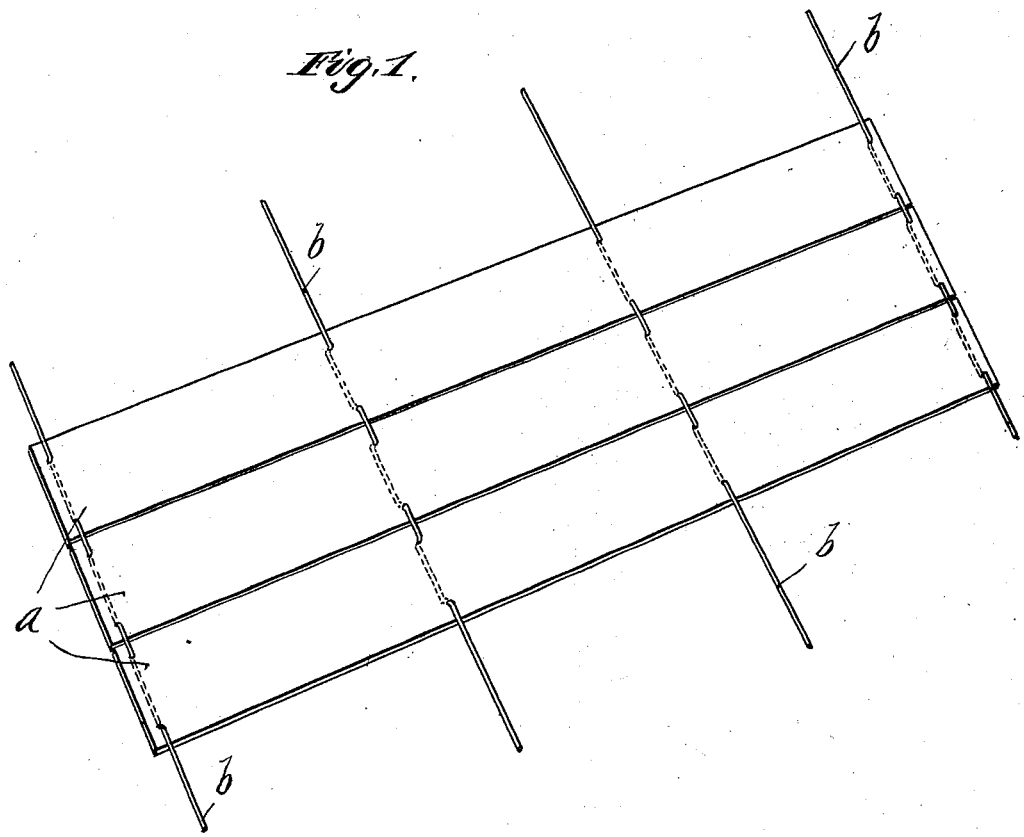
Figure 2:
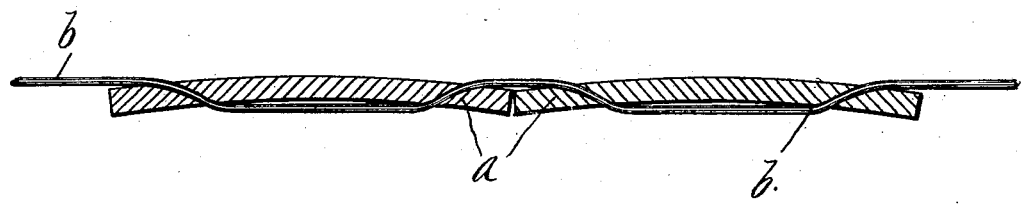
Figure 7:
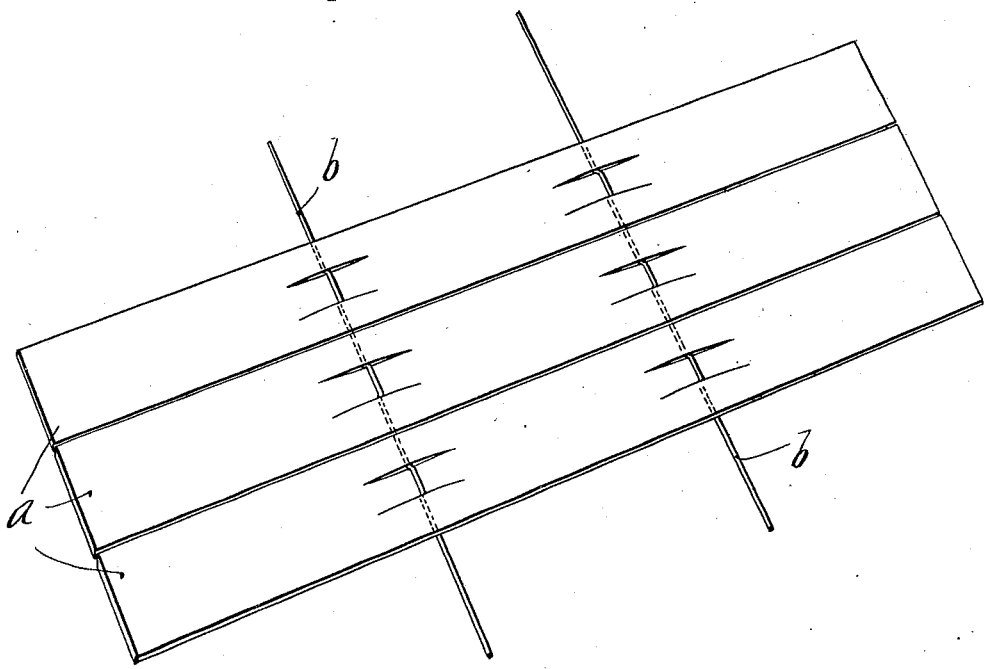
Figure 8:
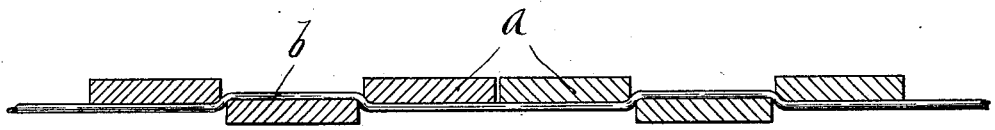
Figure 9:
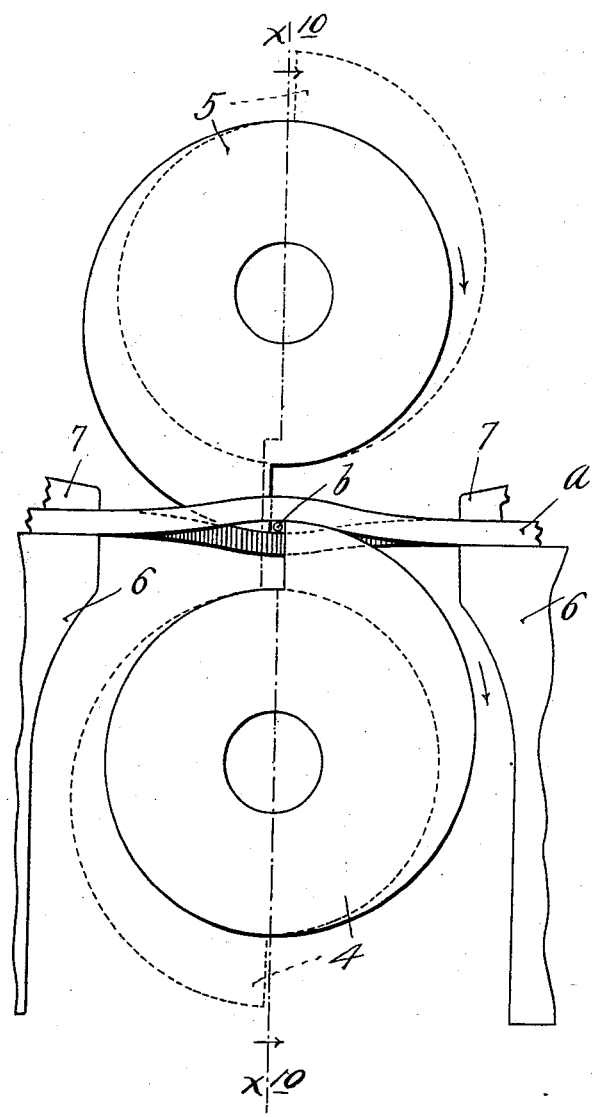
Figure 10:
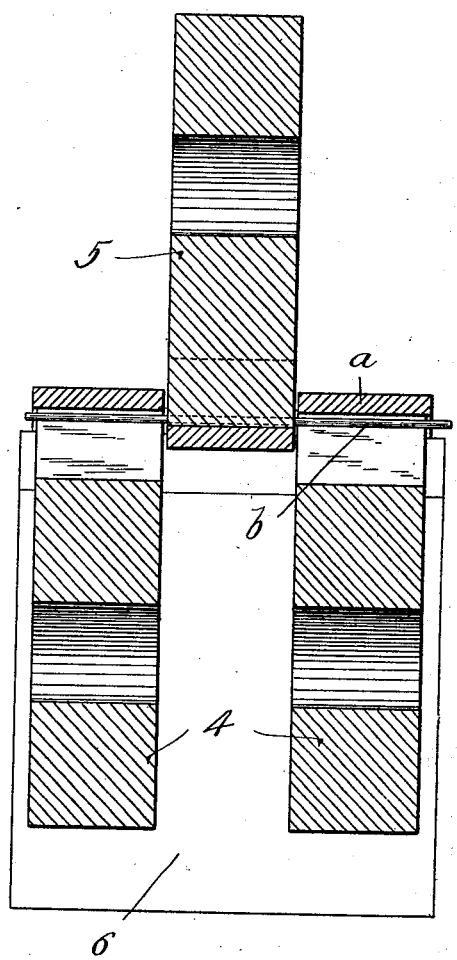

Figures 1 and 2 represent, respectively, in perspective and in cross-section, one form of the new fabric or product of my improved method. Fig. 3 is a view, partly in diagram, illustrating an apparatus suitable for use in making the fabric shown in Figs. 1 and 2 according to my new method. Fig. 4 is a view showing some of the same parts illustrated in Fig. 3, but in end elevation and with some portions broken away. Fig. 5 is a plan view showing the face of the upper or concave die shown in Figs. 3 and 4. Fig. 6 is a similar view showing the face of the convex or lower die illustrated in Figs. 3 and 4. Figs. 7 and 8 are views in perspective and cross-section, respectively, showing a modified form of my new fabric; and Figs. 9 and 10 are views, respectively, in side elevation and in vertical section showing an apparatus suitable for use according to my new process in making the fabric shown in Figs. 7 and 8, the section shown in Fig. 10 being on the line $x^{10}\ x^{10}$ of Fig. 9.

The new method consists in springing the wood to afford spans for embracing the wire and in threading the wire between the said spans when the wood is so sprung. By this new method or process I obtain a new fabric consisting of wood and wire wherein the wire is threaded through spring-spans of the wood. This novel product will be made the subject-matter of another application, and hence, of course, it is not herein claimed.

Usually the fabric is made up of a series of thin wooden slats or boards $a$ and a series of transversely-extended binding-wires $b$ applied to the slats $a$ in the manner above noted. It must be understood, however, that instead of using a series of slats or sections of wood disposed in parallel arrangement edgewise in respect to each other the wood might be in a continuous piece and have the wires applied thereto in the manner described.

By reference to Figs. 3 to 6, inclusive, the method of forming the fabric shown in Figs. 1 and 2 may be readily understood. The slat $a$ or other body of wood to which the wire is to be applied is subject to the action of a pair of dies, one of which is convex and the other of which is concave, so as to spring the slat to a sufficient extent to afford a span through which the wire may be passed. As shown, the lower or convex die 1 has a groove or wire-passage $c$ in its crown, as best seen in Fig. 6, and the upper or concave die 2 is provided with a pair of short grooves $c'$, one at each horn of the die, in proper position for alinement with the groove $c$ in the crown of the convex die 1 when the two dies are in the positions shown in Figs. 3 and 4. In virtue of this construction it follows that when the dies have been forced together into the position shown in Figs. 3 and 4, as required to spring the slat, a suitable tool 3 can be applied to the sprung portion of the slat to form passages therethrough in line with the registering grooves in the two dies. Then when the tool 3 is withdrawn and while the slat is still held by the dies in its sprung position the binding-wire $b$ can be passed through the spring-span of the slat, being guided to the passages therein by the registering sections of the grooves in the two dies. The wire is thus passed through the spring-span of the slat on a straight line, going twice through the slat from the same side of the same, and hence when the slat is relieved from the dies and springs back into normal or flat position the span will embrace the wire with a spring action, thereby slightly kinking the wire and clamping the slat to the wire by the spring tension of the wood. The slat will therefore hold its position on the wire.

To produce the fabric illustrated in Figs. 7 and 8, dies in the form of eccentrics are employed. The slats or body of wood are subjected to the action of said eccentrics, as shown in Figs. 9 and 10, with one of the three eccentrics operating in opposition to the other two. As shown, the two lower eccentrics 4 are spaced apart from each other in proper position to act on the side portions of the slat and afford space or clearance between the same sufficient to permit the upper eccentric 5 to act on the central portion of the slat. The adjacent edges of the three eccentrics are constructed and mounted to have a shearing action in respect to each other on the wood. When the slat is in position for the action of the eccentrics, it is securely held to suitable supporting-tables 6 by suitable clamps 7 or other convenient means applied crosswise of the slats in proper position to determine the length of the spans which are to be sprung. The supporting-tables 6 are spaced apart from each other to afford the necessary clearance for the action of the eccentrics 4 and 5. When the slat is in proper position on the tables 6 and the eccentrics are turned into their closed or full-line position, as shown in Figs. 9 and 10, it is obvious that the two lower eccentrics 4 will separate and spring upward marginal portions of the slat, while the upper or central eccentric 5 will coöperate therewith to separate and spring downward a central portion of the slat, thereby separating the marginal and central portions and affording an opening between the sprung parts, through which the binding-wire will be passed, between the high parts of the eccentrics. When the slat is then relieved from the eccentrics, the sprung portions of the wood will spring back toward their normal positions as far as permitted by the wires, thereby clamping the slat to the wire under the spring tension of the wood and slightly kinking the wire by the spring tension thereon from the wood. The slat will therefore hold its position on the wire by the spring-clamping action of the wood.

In both forms of apparatus utilized in carrying out my improved method of making both forms of the fabric the slats are fed to the dies when the latter are in their separated or open position, with the slats arranged parallel to each other and at right angles to the binding-wires b. Hence the slats can be sprung in succession by the dies and the binding-wires be passed therethrough, so as to connect together a series of slats to form the fabric.

The fabric illustrated as produced by my improved method has been shown as made up of a series of pieces of thin wood and a series of binding-wires applied as described; but it will be understood, of course, that the body of wood might be in the form of a continuous piece of veneer or thin board and the binding-wires be nevertheless applied thereto in the same way as to the series of slats. If a continuous piece of thin wood should be employed, then a series of dies in tandem arrangement might be applied simultaneously to the body of wood and the wires be fed through the series of spring-spans thus formed in the body of wood by the series of dies. Of course it is equally obvious that any desired number of binding-wires may be simultaneously applied to the wood by the use of a proper number of sets of dies in transverse line with each other. The fact that the binding-wires can be threaded through between the spring-spans and the body portions of the wood from a single or common side of the wood on a straight line enables the fabric to be cheaply made and avoids the injury to the wire which would necessarily follow if the wire were stitched back and forth through the wood from the opposite sides of the same. The wire is therefore not hurt by buckling; but its full strength is preserved for sustaining the load.

While the apparatus herein disclosed for applying my process or method to produce my new fabric is well adapted for the purpose, it must be understood that said fabric could be otherwise made. For example, the new method or process herein disclosed might be applied by hand to produce the fabric, or other suitable apparatus might be used for the purpose.

What I claim, and desire to secure by Letters Patent of the United States, is as follows:

1. The method of forming wood-and-wire fabric, which consists in springing the wood to afford spans for embracing the wire, threading the wire between the said spans and the main body of the wood when the wood is so sprung, and then permitting the wood to spring back and clamp the wire, substantially as and for the purposes set forth.

2. The method of forming wood-and-wire fabrics, which consists in springing the wood laterally to afford spring-spans having wire-passages extending transversely of the grain of the wood, threading the wire through said passages between said spans and the main body of the wood when the wood is sprung, and then permitting the wood to spring back onto the wire and kink the same, substantially as described.

In testimony whereof I affix my signature in presence of two witnesses.

ARTHUR O. HUBBARD.

Witnesses:
MABEL M. McGRORY,
F. D. MERCHANT.